US007845409B2

(12) United States Patent
Shinbach et al.

(10) Patent No.: US 7,845,409 B2
(45) Date of Patent: Dec. 7, 2010

(54) LOW DENSITY PROPPANT PARTICLES AND USE THEREOF

(75) Inventors: Madeline P. Shinbach, St. Paul, MN (US); Scott R. Culler, Burnsville, MN (US); Ernest L. Thurber, Somerset, WI (US); John T. Wallace, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/319,830

(22) Filed: Dec. 28, 2005

(65) Prior Publication Data
US 2007/0144736 A1  Jun. 28, 2007

(51) Int. Cl.
E21B 43/26 (2006.01)
(52) U.S. Cl. .................................. 166/280.2
(58) Field of Classification Search .............. 166/280.2
See application file for complete search history.

(56) References Cited

U.S. PATENT DOCUMENTS

| | | | |
|---|---|---|---|
| 2,978,340 A | 4/1961 | Veatch et al. | |
| 3,026,938 A | 3/1962 | Huitt et al. | |
| 3,030,215 A | 4/1962 | Veatch et al. | |
| 3,129,086 A | 4/1964 | Veatch et al. | |
| 3,230,064 A | 1/1966 | Veatch et al. | |
| 3,365,315 A | 1/1968 | Beck et al. | |
| 3,376,930 A | 4/1968 | Kiel et al. | |
| 3,592,266 A | 7/1971 | Tinsley | |
| 3,642,068 A | 2/1972 | Fitch et al. | |
| 3,709,300 A | 1/1973 | Pye | |
| 3,792,136 A | 2/1974 | Schmitt et al. | |
| 3,834,760 A | 9/1974 | Spedden et al. | |
| 3,976,138 A | 8/1976 | Colpoys, Jr. et al. | |
| 4,003,432 A | 1/1977 | Paull et al. | |
| 4,010,802 A | 3/1977 | Miles et al. | |
| 4,029,148 A | 6/1977 | Emery | |
| 4,039,480 A | 8/1977 | Watson et al. | |
| 4,068,718 A | 1/1978 | Cooke, Jr. et al. | |
| 4,072,193 A | 2/1978 | Sarda et al. | |
| 4,111,713 A | 9/1978 | Beck | |
| 4,245,702 A | 1/1981 | Haafkens et al. | |
| 4,249,609 A | 2/1981 | Haafkens et al. | |
| 4,279,632 A | 7/1981 | Frosch et al. | |
| 4,318,766 A | 3/1982 | Smith | |
| 4,391,646 A | 7/1983 | Howell | |
| 4,421,167 A | 12/1983 | Erbstoesser et al. | |
| 4,421,562 A | 12/1983 | Sands | |
| 4,427,068 A | 1/1984 | Fitzgibbon | |
| 4,440,866 A | 4/1984 | Lunghofer et al. | |
| 4,493,875 A | 1/1985 | Beck et al. | |
| 4,568,603 A | 2/1986 | Oldham | |
| 4,587,291 A | 5/1986 | Gardziella et al. | |
| 4,625,274 A | 11/1986 | Schroeder | |
| 4,637,990 A | 1/1987 | Torobin | |
| 4,652,274 A | 3/1987 | Boettcher et al. | |
| 4,660,642 A | 4/1987 | Young | |
| 4,680,230 A | 7/1987 | Gibb et al. | |
| 4,694,905 A | 9/1987 | Armbruster | |
| 4,733,729 A * | 3/1988 | Copeland ................ 166/276 |
| 4,735,362 A | 4/1988 | Trautwein et al. | |
| 4,744,831 A | 5/1988 | Beck | |
| 4,751,138 A | 6/1988 | Tumey et al. | |
| 4,767,726 A | 8/1988 | Marshall | |
| 4,785,884 A | 11/1988 | Armbruster | |
| 4,903,440 A | 2/1990 | Larson et al. | |
| 4,944,905 A | 7/1990 | Gibb et al. | |
| 4,985,340 A | 1/1991 | Palazzotto et al. | |
| 5,077,241 A | 12/1991 | Moh et al. | |
| 5,089,536 A | 2/1992 | Palazzotto | |
| 5,236,472 A | 8/1993 | Kirk et al. | |
| 5,420,174 A | 5/1995 | Dewprashad | |
| 5,690,705 A | 11/1997 | Holmes et al. | |
| 5,714,259 A | 2/1998 | Holmes et al. | |
| 5,863,846 A | 1/1999 | Rorabaugh et al. | |
| 6,192,985 B1 | 2/2001 | Hinkel et al. | |
| 6,221,929 B1 | 4/2001 | Ryugo et al. | |
| 6,372,678 B1 | 4/2002 | Youngman et al. | |

(Continued)

FOREIGN PATENT DOCUMENTS

| | | |
|---|---|---|
| CA | 2 329 834 | 12/2000 |
| EP | 0 091 555 | 10/1983 |
| EP | 0 101 855 | 3/1984 |
| EP | 0 353 740 | 2/1990 |
| EP | 0 773 343 | 5/1997 |
| GB | 2 175 579 | 12/1986 |
| GB | 2 426 023 | 11/2005 |

(Continued)

OTHER PUBLICATIONS

SPE 84308, High Strength, Ultra-Lightweight Proppant Lends New Dimensions to Hydraulic Fracturing Applications, by Allan R. Richards, Harold D. Brannon, William D. Wood, Christopher J. Stephenson, Copyright 2003, Society of Petroleum Engineers, Inc., prepared for presentation at the SPE Annual Technical Conference and Exhibit held in Denver, CO, Oct. 5-8, 2003.

SPE 84309, "Ultra-Lightweight Proppant Development Yields Exciting New Opportunities in Hydraulic Fracturing Design", by William D. Wood, Harold D. Brannon, Allan R. Richards, Chris Stephenson, Copyright 2003, Society of Petroleum Engineers Inc., prepared for presentation at the SPE Annual Technical Conference and Exhibit held in Denver, CO, Oct. 5-8, 2003.

(Continued)

*Primary Examiner*—William P Neuder
(74) *Attorney, Agent, or Firm*—Dena M. Ehrich; Robert H. Jordan

(57) ABSTRACT

Composite proppant particles each of which comprises a plurality of microbubbles and a resin binder are disclosed. Also disclosed are a method of using such composite proppant particles to prop fractures in wells formed in underground formations.

19 Claims, No Drawings

U.S. PATENT DOCUMENTS

| | | | |
|---|---|---|---|
| 6,521,004 | B1 | 2/2003 | Culler et al. |
| 6,582,819 | B2 | 6/2003 | McDaniel et al. |
| 6,620,214 | B2 | 9/2003 | McArdle et al. |
| 6,632,527 | B1 * | 10/2003 | McDaniel et al. ........... 428/402 |
| 6,725,930 | B2 | 4/2004 | Boney et al. |
| 6,752,208 | B1 | 6/2004 | Nguyen |
| 6,753,299 | B2 | 6/2004 | Lunghofer et al. |
| 6,864,297 | B2 | 3/2005 | Nutt et al. |
| 6,906,009 | B2 * | 6/2005 | Shinbach et al. ............ 507/117 |
| 6,913,824 | B2 | 7/2005 | Culler et al. |
| 6,959,773 | B2 | 11/2005 | Mese et al. |
| 6,966,379 | B2 | 11/2005 | Chatterji et al. |
| 6,983,797 | B2 * | 1/2006 | Nguyen et al. .............. 166/278 |
| 2004/0033905 | A1 | 2/2004 | Shinbach et al. |
| 2004/0069409 | A1 | 4/2004 | Wu et al. |
| 2004/0147388 | A1 | 7/2004 | Webber et al. |
| 2004/0261995 | A1 | 12/2004 | Nguyen et al. |
| 2005/0006093 | A1 | 1/2005 | Nguyen |
| 2005/0059555 | A1 | 3/2005 | Dusterhoft et al. |
| 2005/0059558 | A1 | 3/2005 | Blauch et al. |
| 2005/0082062 | A1 | 4/2005 | Webber et al. |
| 2005/0096207 | A1 | 5/2005 | Urbanek |
| 2005/0274523 | A1 | 12/2005 | Brannon et al. |

FOREIGN PATENT DOCUMENTS

| | | |
|---|---|---|
| WO | WO 96/04464 | 2/1996 |
| WO | WO 00/05302 | 2/2000 |
| WO | 02/060681 | 8/2002 |
| WO | WO 2004/097171 | 11/2004 |
| WO | WO 2006/004464 | 1/2006 |
| WO | 2006/084236 | 8/2006 |

OTHER PUBLICATIONS

'FuShengSha' (FSS) Series products, Renchuang Group, http://www.renchuang.com.cn, pp. 1-4, Copyright: Beijing Renchuang Science and Technology Co., Ltd.

Physical Properties of Proppants, Carbo Ceramics, http://www.carboceramics.com, pp. 1-4.

Santamarina, J.C. and Cho, G.C. (2004), Soil Behavior: The Role of Particle Shape, Proc. Skempton, Conf, March, London, pp. 1-14.

3M Specialty Materials For the Oil & Gas Industry, "Tiny Spheres. Big Science", issued Apr. 2004.

U.S. Department of Energy, published in Apr. 1982, Cutler, R. A. and Jones, A. H., "Lightweight Proppants for Deep Gas Well Stimulation" DOE/BC/10038-22.

ASTM D3102-78, "Determination of Isostatic Collapse Strength of Hollow Glass Microspheres".

ASTM D-2840-69, "Average True Particle Density of Hollow Microspheres".

ASTM D3102-72; Hydrostatic Collapse Strength of Hollow Glass Microspheres.

* cited by examiner

LOW DENSITY PROPPANT PARTICLES AND USE THEREOF

FIELD

This invention relates to novel low density proppant particles and methods of use thereof.

BACKGROUND

Fracturing is a well stimulation technique designed to increase the productivity of a well, such as an oil well, by creating highly conductive fractures or channels in the producing geologic formation around the well. One approach is hydraulic fracturing, a process that involves injecting a fluid at a high rate and high pressure to rupture the formation and create cracks in the rock and pumping into these cracks a fluid containing a particulate material (propping agent or proppant) to maintain the cracks or fractures open by resisting the forces which tend to close the fractures. Thus, the function of the propping agent is to provide high permeability in the propped fracture. Hydraulic fracturing has been used with increasing frequency to improve the productivity of gas and oil wells in low permeability reservoirs. Another approach for forming and propping highly conductive fractures utilizes an etching solution such as the acid etching process disclosed in U.S. Pat. Nos. 4,245,702 and 4,249,609 (both Haafkens et al.). Other illustrative examples of fracturing and propping are disclosed in U.S. Pat. No. 3,642,068 (Fitch et al.), U.S. Pat. No. 3,709,300 (Pye), and U.S. Pat. No. 4,029,148 (Emery).

The list of particulate materials that have been disclosed as proppants includes: sand, nut shells, aluminum and aluminum alloys, wood chips, crushed coke, granulated slag, pulverized coal, crushed rock, granules of metal such as steel, sintered bauxite, sintered alumina, refractories such as mullite and glass beads. Although sand is still a prevalent proppant, at closure stresses encountered in deep formations, it tends to disintegrate, producing fines or fragments which can reduce permeability of the propped fracture. This tendency begins at closure stresses above about 5,000 psi (34.5 MPa).

Proppants developed to withstand increased overburden pressure in deeper wells are sintered bauxite, e.g., U.S. Pat. No. 4,068,718, and zirconium oxide, e.g., U.S. Pat. No. 4,072,193. Coated proppants have also been proposed such as metal coated proppants in U.S. Pat. No. 3,376,930 and plastic coated proppants in U.S. Pat. No. 3,026,938. U.S. Pat. No. 3,976,138 (Colploys, Jr. et al.) discloses the use of alumina proppants.

Sintered bauxite has high sphericity and good chemical stability in well formations. However, its cost is much greater than that of the more common sand proppants. Since the specific gravity of bauxite is substantially greater than sand, the cost per unit volume of bauxite is even more expensive than sand.

The higher specific gravity of bauxite affects the transport of the proppant into the fracture. Generally speaking, lower specific gravity proppants can be carried further into fractures than those of higher specific gravity. Lower specific gravity proppants permit decreases in pumping rates during proppant placement which in turn reduces bottom hole pressure. The reduction of bottom hole pressure is felt to limit the vertical propagation of fractures (horizontal propagation being desired). In addition, lower proppant density allows for the use of less expensive fracturing fluids.

According to a study done for the U.S. Department of Energy, published in April 1982 (Cutler, R. A. and Jones, A. H., "Lightweight Proppants for Deep Gas Well Stimulation" DOE/BC/10038-22) an ideal proppant for hydraulic fracturing would have a specific gravity less than two, be able to withstand a closure stress of 138 MPa; be chemically inert in brine at temperatures to 200° C., have perfect sphericity (a Krumbein roundness of 1), cost the same as sand on a volume basis, and have a narrow proppant size distribution. The same report admits that such a proppant is not likely to be forthcoming in the foreseeable future; however, it states that a proppant capable of withstanding closure stresses of 85 MPa, having a specific gravity of 2.6 to 3 and costing ⅓ to ½ the price of bauxite would solve about 90% of the current hydraulic fracturing problems.

U.S. Pat. Nos. 4,680,230 and 4,944,905 (both Gibb et al.) disclose particulate ceramics and their use as proppants in hydraulic fracturing.

SUMMARY OF INVENTION

The present invention provides a novel class of composite particles for use as proppants in underground wells and a method for using such composite proppant particles for improving the flow of subject fluids through propped channels.

In brief summary, proppants of the invention are composite particles each of which comprises a plurality of high strength microbubbles and a resin binder.

Briefly summarizing, the method of the invention comprises: (a) introducing into a well in an underground formation a fluid mixture of carrier fluid and a plurality of composite proppant particles, wherein the composite proppants comprise a composite of a plurality of high strength microbubbles and a resin binder and the well has fractures in the side walls thereof, and (b) depositing a plurality of said composite proppant particles in fractures in the to yield one or more propped channels. In some embodiments, in addition to propping open fractures in the side wall of bored wells, methods of the invention may further comprise forming fractures in the side walls of a well and/or transmitting a subject fluid, e.g., oil or natural gas, through propped channels.

The composite proppant particles of the invention have low density and accordingly may be deposited in fractures using low density carrier fluids if desired. The method of the invention can be used to improve the performance of wells, e.g., for extraction of subject fluid from underground formations or injection of subject fluid into underground reservoirs such as for storage. The invention may be used with a variety of subject fluids, e.g., crude or refined oil, natural gas, and water.

DETAILED DESCRIPTION OF ILLUSTRATIVE EMBODIMENTS

Composite Proppant Particles

Composite proppant particles of the invention each comprise a composite of a plurality of microbubbles and a polymeric resin.

The composite proppant particles may be made in any desired size and shape. The size and shape will be dependent in part upon such factors as the component materials used, the well fractures to be propped, the equipment to be used to inject the proppant particles into the well, and the carrier fluid used.

In some embodiments, composite proppant particles of the invention will be made with relatively non-spherical shape. For example, in some embodiments of the invention the composite proppant particles will have a sphericity of less than about 0.9, and in some instances less than about 0.7, as measured according to American Petroleum Institute Method RP56, Section 5.

The composite proppant particles may range from particles having a substantially continuous polymeric resin phase having a plurality microbubbles dispersed therein to composite proppant particles comprising an agglomerate of microbubbles bound together by a substantially discontinuous phase of polymeric resin. Composite proppant particles having intermediate proportions of microbubbles and resin binder are also contemplated. Typically, composite proppant particles of the invention will comprise from about 0.1 to about 75 weight percent microbubbles.

Composite proppant particles of the invention will typically have an average size from about 5 to about 1000 microns, preferably from about 10 to about 800 microns. In some embodiments, the particles will have an average size of over about 200 microns.

Composite proppant particles of the invention will typically have a density of about 0.5 to about 1.8 g/cm$^3$. Preferably the density is from about 0.8 to about 1.2 g/cm$^3$.

Composite proppant particles of the invention will typically have an isotactic collapse strength of said of about 500 psi (3.45 MPa) or greater, in some embodiments of about 2000 psi (13.8 MPa) or greater, and in other embodiments of about 10,000 psi (69.0 MPa) or greater. The compressive collapse strength required for a specific application will be dependent in large part upon the depth at which the proppant particles will be employed. At relatively shallow depths, the compressive strength of microbubble component does not have to be high, but at very great depths, in deep undersea applications, the hydrostatic pressure exerted on the microbubble component becomes enormous, and the microbubble component should have very high resistance to compression (high compressive strengths). Hollow microbubbles, because of their spherical form, provide resistance to compression equally from all directions (isotropic compressive strength), and are ideally suited for this application.

Microbubbles

The microbubbles used in the composite proppants of the invention may be of many types of hollow bubbles such as are well known. The microbubbles are preferably made of glass, but may be made be ceramic, resin, or other materials, provided the microbubbles have sufficient physical properties to withstand the severe conditions encountered in use, including collapse strength, hydrolytic stability, size, density and compatibility with the polymeric resins selected as a binder material.

Microbubbles useful in composite proppant particles of the invention are hollow. They are typically ellipsoidal in shape, and in some instances may be substantially spherical in shape. In some instances, they may be cratered in shape. All such particles will be referred to herein and in the attached claims as "microbubbles".

The microbubbles used in composite proppants of the invention typically have an average size of from about 5 to about 1000 microns, preferably from about 10 to about 800 microns. Microbubbles comprising different sizes or a range of sizes may be used.

As the microbubbles are subjected to high pressures in a well, the microbubbles should have a collapse strength in excess of the anticipated pressures. Generally the microbubble component should have a burst strength in excess of 4000 psi (27.6 MPa), preferably in excess 5000 psi (34.5 MPa), more preferably in excess of 10,000 psi (69.0 MPa), and even more preferably in excess of 15,000 psi (103 MPa), as measured by ASTM D3102-78 with 10% collapse and percent of total volume instead of void volume as stated in the test. An illustrative example of preferred microbubbles is 3M™ S60HS Glass Bubbles which have a crush strength in excess of 18,000 psi (124 MPa).

Suitable glass microbubbles have been known for many years, as is shown by European Patent 0 091,555, and U.S. Pat. Nos. 2,978,340, 3,030,215, 3,129,086 3,230,064, all of which teach a process of manufacture involving simultaneous fusion of the glass-forming components and expansion of the fused mass. U.S. Pat. No. 3,365,315 (Beck), U.S. Pat. No. 4,279,632 (Howell), U.S. Pat. No. 4,391,646 (Howell) and U.S. Pat. No. 4,767,726 (Marshall) teach an alternate process involving heating a glass composition containing an inorganic gas forming agent, and heating the glass to a temperature sufficient to liberate the gas and at which the glass has viscosity of less than about 10$^4$ poise.

Typically, microbubbles used herein will have a density of at least 0.1 g/cm$^3$, generally between about 0.1 and about 0.9 g/cm$^3$, and preferably between about 0.2 and about 0.9 g/cm$^3$. Density as discussed herein is determined (according to ASTM D-2840-69) by weighing a sample of microbubbles and determining the volume of the sample with an air comparison pycnometer (such as a AccuPyc™ 1330 Pycnometer or a Beckman™ Model 930). Typically, higher densities microspheres will exhibit higher strengths. The microbubbles generally have an average diameter from about 5 to about 1000 microns, and preferably from about 10 to about 800 microns.

Microbubbles of suitable size, shape, and density be prepared by a number of means. Illustrative methods and apparatus for formation of microspheres that can be used herein are described in U.S. Pat. No. 3,129,086 or 3,230,064.

One method of preparing glass microspheres suitable for use herein is taught in U.S. Pat. No. 3,030,215, which describes the inclusion of a blowing agent in an unfused raw batch of glass-forming oxides. Subsequent heating of the mixture simultaneously fuses the oxides to form glass and triggers the blowing agent to cause expansion. U.S. Pat. No. 3,365,315 describes an improved method of forming glass microspheres in which pre-formed amorphous glass particles are subsequently reheated and converted into glass microspheres. U.S. Pat. No. 4,391,646 discloses that incorporating about 1 to about 30 weight percent of $B_2O_3$, or boron trioxide, in glasses used to form microspheres, as in U.S. Pat. No. 3,365,315, improves strength, fluid properties, and moisture stability. A small amount of sodium borate remains on the surface of these microspheres, causing no problem in most applications. Removal of the sodium borate by washing is possible, but at a significant added expense; even where washing is carried out, however, additional sodium borate leaches out over a period of time.

U.S. Pat. No. 4,767,726 (Marshall) discloses a method for producing hollow glass microspheres that can be used herein and which exhibit good hydrolytic stability. These microspheres are made from a borosilicate glass and have a chemical composition consisting essentially of $SiO_2$, CaO, $Na_2O$, $B_2O_3$, and $SO_3$ blowing agent. A characterizing feature of the microspheres resides in the alkaline metal earth oxide:alkali metal oxide (RO:$R_2O$) ratio, which substantially exceeds 1:1 and lies above the ratio present in any previously utilized simple borosilicate glass compositions. As the RO:$R_2O$ ratio increases above 1:1, simple borosilicate compositions become increasingly unstable, devitrifying during traditional working and cooling cycles, so that "glass" compositions are not possible unless stabilizing agents such as $Al_2O_3$ are included in the composition. Such unstable compositions have been found to be highly desirable for making glass microspheres, rapid cooling of the molten gases by water quenching, to form frit, preventing devitrification. During subsequent bubble forming, as taught in aforementioned U.S. Pat. Nos. 3,365,315 and 4,391,646, the microspheres cool so rapidly that devitrification is prevented, despite the fact that the $RO:R_2O$ ratio increases even further because of loss of the relatively more volatile alkali metal oxide compound during forming. These microspheres have a density ranging from about 0.08 or less to about 0.8 $g/cm^3$, the less dense products being more economical per unit volume. Glass microspheres having a higher density are, however, particularly useful in the present invention where comparatively lightweight microspheres having high resistance to crushing is desired. These microspheres, in which the chemical composition, expressed in weight percent, consists essentially of at least 70 percent $SiO_2$, 8 to 15 percent RO, 3 to 8 percent $R_2O$, 2 to 6 percent $B_2O_3$, and 0.125 to 1.50 percent $SO_3$, the foregoing components constituting at least about 90 percent (preferably 94 percent and still more preferably 97 percent) of the glass, the $RO:R_2O$ weight ratio being in the range of 1.2 to 3.5.

Preparation of hollow, ceramic microspheres by spray drying is taught in U.S. Pat. No. 4,421,562. U.S. Pat. No. 4,637,990 describes hollow, ceramic, porous microspheres prepared by a blowing technique. U.S. Pat. No. 4,279,632 discloses a method and apparatus for producing concentric hollow spheres by a vibration technique on extruded materials to break up the material into individual, spherical bodies. This method is useful with low melting point material such as glass or metal which is fluid at elevated operating temperatures. Hollow ceramic balls prepared by a combination of coating, sintering, and reduction are disclosed in U.S. Pat. No. 4,039,480; however, the process is complex, and the balls so obtained are typically large. Ceramic metal oxide microspheres prepared by impregnating hollow, organic resin microspheres with a metal compound and firing to remove adjuvants are disclosed in U.S. Pat. No. 3,792,136. U.S. Pat. No. 2,978,340 describes inorganic microspheres prepared from a fusion (melt or vitreous) process using a gassing agent. The product is not uniform in size, and the microspheres are not all hollow.

Hollow ceramic spheres of low density may be prepared by the process taught in U.S. Pat. Nos. 4,111,713, and 4,744,831, which comprises:

(1) tumbling together and thoroughly mixing (a) solidifiable liquid globules comprising a thermally fugitive organic binder material and a source of void-forming agent adapted to evolve as a gas and convert the liquid globules to a hollow condition and (b) a mass of minute discrete free-flowing inorganic heat-sinterable parting agent particles selected from metals, metalloids, metal oxides and metal salts that are wetted by, and at least partially absorbed into, the liquid globules during the tumbling action; sufficient parting agent particles being present so that any portion of liquid globules uncovered by parting agent particles tumble against discrete unabsorbed parting agent particles;

(2) providing conditions during the tumbling action, and tumbling for a sufficient time, for the void-forming agent to evolve as a gas and form a central interior space within the liquid globules and for the thus-hollowed liquid globules to solidify;

(3) collecting the converted globules after they have solidified to a shape-retaining condition; and (4) firing the hollow spheres to first burn out the organic binder, and to then sinter the parting agent particles to form hollow shape-retaining spheres.

Another useful ceramic microsphere is taught in U.S. Pat. No. 5,077,241 (Moh et al.) which comprises microspheres consisting essentially of at least one of a non-oxide component (or phase) and an oxide component (or phase), each microsphere having a ceramic wall and a single central cavity, the microspheres having diameters in the range from about 1 to about 300 microns and wall thicknesses of less than about 10 percent of the diameter of the microspheres. Such ceramic microspheres may be prepared by:

(1) providing a mixture containing a ceramic sol precursor and a volatile liquid, the volatile liquid being referred to herein as bloating agent, (2) adding the above mixture, preferably as droplets, at a suitable rate and manner to a provided bubble promoting medium maintained at a suitable temperature to allow formation of green hollow microspheres; preferably the bubble promoting medium is a liquid such as an aliphatic alcohol, e.g., oleyl alcohol, or a long chain carboxylic acid ester such as peanut oil, or mixtures thereof, or mixtures of oleyl alcohol with other vegetable oils or vegetable oil derivatives, (3) isolating the green microspheres, preferably by filtration, and (4) firing the green microspheres, optionally mixed with an agglomeration preventative agent to provide a source of carbon, in air for oxide containing ceramic microspheres or in an inert or reducing atmosphere for non-oxide containing microspheres, and at a range of temperature sufficient to convert the green microspheres into an oxide or non-oxide containing ceramic.

An advantage of the present invention is that the microbubbles used in composite particles of the invention, as well as the composite proppant particles themselves, can be made with relatively uniform size and shape, or made or selected such that they differ in size, shape, or both significantly. The variation of size, shape, or both may be substantially random or may be according to a desired distribution.

Binder Resin and Manufacture of Composite Proppant Particles

The polymeric binder resin may be a thermoplastic or thermoset resin.

Thermoplastic polymers may be used as a binder in the composite proppant particle. Thermoplastic polymers which may be used in the present invention include but are not limited to melt-processible polyolefins and copolymers and blends thereof, styrene copolymers and terpolymers (such as KRATON™), ionomers (such as SURLYN™), ethyl vinyl acetate (such as ELVAX™), polyvinylbutyrate, polyvinyl chloride, metallocene polyolefins (such as AFFINITY™ and ENGAGE™), poly(alpha olefins) (such as VESTOPLAST™ and REXFLEX™), ethylene-propylene-diene terpolymers, fluorocarbon elastomers (such as THV™ from 3M Dyneon), other fluorine-containing polymers, polyester polymers and copolymers (such as HYTREL™), polyamide polymers and copolymers, polyurethanes (such as ESTANE™ and MORTHANE™), polycarbonates, polyketones, polyureas, acrylates, and methacrylates. The thermoplastic polymers include blends of homo- and copolymers, as well as blends of two or more homo- or copolymers. As used herein "melt-processible" refers to thermoplastic polymers having a melt index of from 3 to 30 g/10 min.

Useful polyamide polymers include, but are not limited to, synthetic linear polyamides, e.g., nylon-6 and nylon-66, nylon-11, or nylon-12. It should be noted that the selection of a particular polyamide material might be based upon the physical requirements of the particular application for the resulting reinforced composite article. For example, nylon-6 and nylon-66 offer higher heat resistant properties than nylon-11 or nylon-12, whereas nylon-11 and nylon-12 offer better chemical resistant properties. In addition to those polyamide materials, other nylon materials such as nylon-612, nylon-69, nylon-4, nylon-42, nylon-46, nylon-7, and nylon-8 may also be used. Ring containing polyamides, e.g., nylon-6T and nylon-6I may also be used. Polyether containing polyamides, such as PEBAX™ polyamides (Atochem North America, Philadelphia, Pa.), may also be used.

Polyurethane polymers which can be used include aliphatic, cycloaliphatic, aromatic, and polycyclic polyurethanes. These polyurethanes are typically produced by reaction of a polyfunctional isocyanate with a polyol according to well-known reaction mechanisms. Commercially available urethane polymers useful in the present invention include: PN-04 or 3429 from Morton International, Inc., Seabrook, N.H., and X4107 from B.F. Goodrich Company, Cleveland, Ohio.

Also useful are polyacrylates and polymethacrylates which include, for example, polymers of acrylic acid, methyl acrylate, ethyl acrylate, acrylamide, methylacrylic acid, methyl methacrylate, n-butyl acrylate, and ethyl acrylate, to name a few.

Other useful substantially extrudable hydrocarbon polymers include polyesters, polycarbonates, polyketones, and polyureas. These materials are generally commercially available, for example: SELAR® polyester (DuPont, Wilmington, Del.); LEXAN® polycarbonate (General Electric, Pittsfield, Mass.); KADEL® polyketone (Amoco, Chicago, Ill.); and SPECTRIM® polyurea (Dow Chemical, Midland, Mich.).

Useful fluorine-containing polymers include crystalline or partially crystalline polymers such as copolymers of tetrafluoroethylene with one or more other monomers such as perfluoro(methyl vinyl)ether, hexafluoropropylene, perfluoro(propyl vinyl)ether; copolymers of tetrafluoroethylene with ethylenically unsaturated hydrocarbon monomers such as ethylene, or propylene.

Still other fluorine-containing polymers useful in the invention include those based on vinylidene fluoride such as polyvinylidene fluoride; copolymers of vinylidene fluoride with one or more other monomers such as hexafluoropropylene, tetrafluoroethylene, ethylene, propylene, etc. Still other useful fluorine-containing extrudable polymers will be known to those skilled in the art as a result of this disclosure.

Representative examples of polyolefins useful in this invention are polyethylene, polypropylene, polybutylene, poly(1-butene), poly(3-methylbutene), poly(4-methylpentene) and copolymers of ethylene with propylene, 1-butene, 1-hexene, 1-octene, 1-decene, 4-methyl-1-pentene and 1-octadecene, and blends thereof. Useful commercially available polyolefins include MOPLEN™ and ADFLEX™ KS359 polypropylene available from Basell, Bloomington, Del., SRC 7644 polypropylene available from Exxon/Mobil, Edison, N.J.

Representative blends of polyolefins useful in this invention are blends containing polyethylene and polypropylene, low-density polyethylene and high-density polyethylene, and polyethylene and olefin copolymers containing the copolymerizable monomers, some of which are described above, e.g., ethylene and acrylic acid copolymers; ethyl and methyl acrylate copolymers; ethylene and ethyl acrylate copolymers; ethylene and vinyl acetate copolymers-, ethylene, acrylic acid, and ethyl acrylate copolymers, and ethylene, acrylic acid, and vinyl acetate copolymers.

The useful thermoplastic polyolefins may also comprise functionalized polyolefins, i.e., polyolefins that have additional chemical functionality, obtained through either copolymerization of olefin monomer with a functional monomer or graft copolymerization subsequent to olefin polymerization. Typically, such functionalized groups include O, N, S, P, or halogen heteroatoms. Such reactive functionalized groups include carboxylic acid, hydroxyl, amide, nitrile, carboxylic acid anhydride, or halogen groups. Many functionalized polyolefins are available commercially. For example, copolymerized materials include ethylene-vinyl acetate copolymers, such as the ELVAX™ series, commercially available from DuPont Chemicals, Wilmington, Del., the ELVAMIDE™ series of ethylene-polyamide copolymers, also available from DuPont, and ABCITE™ 1060WH, a polyethylene-based copolymer comprising approximately 10 percent by weight of carboxylic acid functional groups, commercially available from Union Carbide Corp., Danbury, Conn. Examples of graft-copolymerized functionalized polyolefins include maleic anhydride-grafted polypropylene, such as the EPOLENE™ series commercially available from Eastman Chemical Co., Kingsport, Tenn. and QUESTRON™, commercially available from Himont U.S.A., Inc., Wilmington, Del.

In a preferred method of making a composite proppant particle, the microbubbles, preferably glass microspheres are metered into a molten stream of thermoplastic polymer under low shear conditions to form a mixture, and the mixture is then formed into the desired size and shape. This process may comprise a two-stage extrusion process whereby a thermoplastic polymer is melted in the first stage of an extruder and conveyed to a second stage, where the microbubbles are added to the molten stream. The microbubbles and the thermoplastic resin are mixed in the second stage, the mixture degassed and extruded in the desired form.

Thermoset polymers may be used as the binder for composite proppant particles of the invention. As used herein, thermoset refers to a polymer that solidifies or sets irreversibly when cured. Curable binder precursor can be cured by radiation energy or thermal energy. Thermosettable compositions may include components that have a radiation or heat crosslinkable functionality such that the composition is curable upon exposure to radiant curing energy in order to cure and solidify, i.e., polymerize and/or crosslink, the composition. Representative examples of radiant curing energy include electromagnetic energy (e.g., infrared energy, microwave energy, visible light, ultraviolet light, and the like), accelerated particles (e.g., electron beam energy), and/or energy from electrical discharges (e.g., coronas, plasmas, glow discharge, or silent discharge).

Radiation crosslinkable functionality refers to functional groups directly or indirectly pendant from a monomer, oligomer, or polymer backbone that participate in crosslinking and/or polymerization reactions upon exposure to a suitable source of radiant curing energy. Such functionality generally includes not only groups that crosslink via a cationic mechanism upon radiation exposure but also groups that crosslink via a free radical mechanism. Representative examples of radiation crosslinkable groups suitable in the practice of the present invention include epoxy groups, (meth)acrylate groups, olefinic carbon-carbon double bonds, allylether groups, styrene groups, (meth)acrylamide groups, combinations of these, and the like.

Typically, radiation curable binder precursor material comprises at least one of epoxy resin, acrylated urethane resin, acrylated epoxy resin, ethylenically unsaturated resin, aminoplast resin having at least one pendant unsaturated carbonyl group, isocyanurate derivatives having at least one pendant acrylate group, isocyanate derivatives having at least one pendant acrylate group, or combinations thereof. Other suitable thermoset polymers include those derived from phenolic resins, vinyl ester resins, vinyl ether resins, urethane resins, cashew nut shell resins, naphthalinic phenolic resins, epoxy modified phenolic resins, silicone (hydrosilane and hydrolyzable silane) resins, polyimide resins, urea formaldehyde resins, methylene dianiline resins, methylpyrrolidinone resins, acrylate and methacrylate resins, isocyanate resins, unsaturated polyester resins, and mixtures thereof.

A polymer precursor or precursors may be provided to form the desired thermoset polymer. The polymer precursor or thermoset resin may comprise monomers, or may comprise a partially polymerized, low molecular weight polymer, such as an oligomer, if desired. Solvent or curative agent, such as a catalyst, may also be provided where required. In one method, the microbubble composite may be prepared by mixing the microbubbles with a polymer precursor or resin and subsequently curing the polymer precursor or resin. A solvent, if any, may be removed by evaporation. The evaporation and polymerization may take place until the polymerization is substantially complete.

Epoxy (epoxide) monomers and prepolymers are commonly used in making thermoset epoxy materials, and are well known in the art. Thermosettable epoxy compounds can be cured or polymerized by cationic polymerization. The epoxy-containing monomer can also contain other epoxy compounds or blends of epoxy containing monomers with thermoplastic materials. The epoxy-containing monomer may be blended with specific materials to enhance the end use or application of the cured, or partially cured, composition.

Useful epoxy-containing materials include epoxy resins having at least one oxirane ring polymerizable by a ring opening reaction. Such materials, broadly called epoxides, include both monomeric and polymeric epoxides, and can be aliphatic, cycloaliphatic, or aromatic. These materials generally have, on the average, at least two epoxy groups per molecule, and preferably have more than two epoxy groups per molecule. The average number of epoxy groups per molecule is defined herein as the number of epoxy groups in the epoxy-containing material divided by the total number of epoxy molecules present. Polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy-containing material may vary from 58 to about 100,000 or more. Mixtures of various epoxy-containing materials can also be used.

Examples of some epoxy resins useful in this invention include 2,2-bis[4-(2,3-epoxypropyloxy)phenyl]propane (diglycidyl ether of bisphenol A) and materials under the trade designation "EPON™ 828", "EPON™ 1004" and "EPON™ 1001F", commercially available from Hexion Specialty Chemicals, Inc. Columbus, Ohio, "DER-331", "DER-332" and "DER-334", commercially available from Dow Chemical Co., Freeport, Tex., Other suitable epoxy resins include glycidyl ethers of phenol formaldehyde novolac (e.g., "DEN-431" and "DEN-428", commercially available from Dow Chemical Co.) and BLOX™ 220 thermoplastic epoxy resin available from Dow, Midland, Mich. The epoxy resins used in the invention can polymerize via a cationic mechanism with the addition of appropriate photoinitiator(s). These resins are further described in U.S. Pat. Nos. 4,318,766 and 4,751,138, which are incorporated by reference. In addition they can be cured by in that catalysts and/or co-curatives, sometimes referred to as crosslinking agents, can be used to open the ring and link two or more chains together to form a crosslinked polymer. For example, polycarboxylic acid anhydrides and other polyfunctional compounds such as polyamines, polycarboxylic acids, polymercaptans, polyacid halides, or the like are capable of linking two or more epoxy site. A preferred polyamine is dicycandiamide (available from Air Products and Chemicals; Allentown, Pa., under the trade designation AMICURE™ CG-1400). The result is an increased amount of three-dimensional structure in the crosslinked or cured polymer, and hence an increased amount of rigidity of the polymer structure.

In some instances, it may be useful to include epoxy cure catalyst in compositions according to the present invention. Epoxy cure catalysts are well known and include imidazoles such as, for example, 2-ethylimidazole, and 2-ethyl-4-methylimidazole (e.g., as marketed under the trade designation "IMICURE™ EMI-2,4" by Air Products and Chemicals, Allentown, Pa., and 2-propylimidazole (e.g., as marketed under the trade designation "ACTIRON™ NXJ-60" by Synthron, Morganton, N.C.); and Lewis acid complexes such as boron trifluoride and boron trichloride complexes including, for example, $BF_3$.diethylamine and a $BCl_3$.amine complex marketed under the trade designation "OMICURE™ BC-120" by CVC Specialty Chemicals, Maple Shade, N.J.

Other known epoxy cure catalysts include aliphatic and aromatic tertiary amines including, for example, dimethylpropylamine, pyridine, dimethylaminopyridine, and dimethylbenzylamine.

Exemplary acrylated urethane resin includes a diacrylate ester of a hydroxy terminated isocyanate extended polyester or polyether. Examples of commercially available acrylated urethane resin include "UVITHANE™ 782" and "UVITHANE™ 783," both available from Morton Thiokol Chemical, Moss Point, Miss., and "CMD 6600", "CMD 8400", and "CMD 8805", all available from Radcure Specialties, Pampa, Tex.

Exemplary acrylated epoxy resin includes a diacrylate ester of epoxy resin, such as the diacrylate ester of an epoxy resin such as bisphenol. Examples of commercially available acrylated epoxy resin include "CMD 3500", "CMD 3600", and "CMD 3700", available from Radcure Specialties.

Exemplary ethylenically unsaturated resin includes both monomeric and polymeric compounds that contain atoms of carbon, hydrogen and oxygen, and optionally, nitrogen or the halogens. Oxygen atoms, nitrogen atoms, or both, are generally present in ether, ester, urethane, amide, and urea groups. Ethylenically unsaturated resin typically has a molecular weight of less than about 4,000 and is in one embodiment an ester resulting from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Representative examples of other useful acrylates include methyl methacrylate, ethyl methacrylate, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, and pentaerythritol tetraacrylate. Other useful ethylenically unsaturated resins include monoallyl, polyallyl, and polymethylallyl esters and amides of carboxylic acids, such as diallyl phthalate, diallyl adipate, and N,N-diallyladipamide. Still, other useful ethylenically unsaturated resins include styrene, divinyl benzene, and vinyl toluene. Other useful nitrogen-containing, ethylenically unsaturated resins include tris(2-acryloyl-oxyethyl)isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

Some useful aminoplast resins can be monomeric or oligomeric. Typically, the aminoplast resins have at least one pendant α,β-unsaturated carbonyl group per molecule. These α,β-unsaturated carbonyl groups can be acrylate, methacrylate, or acrylamide groups. Examples of such resins include N-hydroxymethyl-acrylamide, N,N'-oxydimethylenebisacrylamide, ortho and para acrylamidomethylated phenol, acrylamidomethylated phenolic novolac, and combinations thereof. These materials are further described in U.S. Pat. Nos. 4,903,440 and 5,236,472, which are incorporated by reference.

Useful isocyanurate derivatives having at least one pendant acrylate group and isocyanate derivatives having at least one pendant acrylate group are further described in U.S. Pat. No. 4,652,274, which is incorporated by reference. One such isocyanurate material is a triacrylate of tris(2-hydroxyethyl) isocyanurate.

Examples of vinyl ethers suitable for this invention include vinyl ether functionalized urethane oligomers, commercially available from Allied Signal, Morristown, N.J., under the trade designations "VE 4010", "VE 4015", "VE 2010", "VE 2020", and "VE 4020".

Phenolic resins are low cost, heat resistant, and have excellent physical properties. Acid cure resole phenolic resins are disclosed in U.S. Pat. No. 4,587,291. Phenol resins used in some embodiments of the invention can have a content of monomeric phenols of less than 5 percent. The resins can also be modified additionally with up to 30 percent of urea, melamine, or furfuryl alcohol, according to known methods.

Phenol resoles are alkaline condensed, reaction products of phenols and aldehydes, wherein either mono- or polynuclear phenols may be used. In further detail, mononuclear phenols, and both mono- and polyfunctional phenols, such as phenol itself, and the alkyl substituted homologs, such as o-, m-, p-cresol or xylenols, are suitable. Also suitable are halogen-substituted phenols, such as chloro- or bromophenol and polyfunctional phenols, such as resorcinol or pyrocatechol. The term "polynuclear phenols" refers, for example, to naphthols, i.e., compounds with fused rings. Polynuclear phenols may also be linked by aliphatic bridges or by heteroatoms, such as oxygen. Polyfunctional, polynuclear phenols may also provide suitable thermosetting phenyl resoles.

The aldehyde component used to form the phenol resoles can be formaldehyde, acetaldehyde, propionaldehyde, or butyraldehyde, or products that release aldehyde under condensation conditions, such as, for example, formaldehyde bisulfite, urotropin, trihydroxymethylene, paraformaldehyde, or paraldehyde. The stoichiometric quantities of phenol and aldehyde components can be in the ratio of 1:1.1 to 1:3.0. The resins can be used in the form of aqueous solutions with a content of non-volatile substances of from about 60 to about 85 percent.

Oxetane ring monomers may also be used to form the matrix phase thermoset polymers. Oxetane (oxacyclobutane) rings behave somewhat like epoxy (oxirane) rings in that catalysts and/or co-curatives, sometimes referred to as crosslinking agents, can be used to open the ring and link two or more chains together to form a crosslinked polymer. For example, polycarboxylic acid anhydrides and other polyfunctional compounds such as polyamines, polycarboxylic acids, polymercaptans, polyacid halides, or the like are capable of linking two or more oxetane sites just as epoxy sites are linked by epoxide cocuratives. The result is an increased amount of three-dimensional structure in the crosslinked or cured polymer, and hence an increased amount of rigidity of the polymer structure.

The mixture of microbubbles and curable binder precursor material may be cured by an initiator selected from the group consisting of photoinitiator, thermal initiator, and combinations thereof. As used herein, a thermal initiator may be used when thermal energy is used in the at least partially curing step, and photoinitiators may be used when ultraviolet and/or visible light is used in the at least partially curing step. The requirement of an initiator may depend on the type of the curable binder precursor used and/or the type of energy used in the at least partially curing step (e.g., electron beam or ultraviolet light). For example, phenolic-based curable binder precursors typically do not require the addition of an initiator when at least thermally cured. However, acrylate-based curable binder precursors typically do require the addition of an initiator when at least thermally cured. As another example, initiators typically are not required when electron beam energy is used during the at least partially curing step. However, if ultraviolet or visible light is utilized, a photoinitiator is typically included in the composition.

Upon being exposed to thermal energy, a thermal initiator generates a free radical source. The free radical source then initiates the polymerization of the curable binder precursor. Exemplary thermal initiators include organic peroxides (e.g., benzoil peroxide), azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Azo compounds suitable as thermal initiators in the present invention may be obtained under the trade designations "VAZO™ 52," "VAZO™ 64," and "VAZO™ 67" from E.I. duPont deNemours and Co., Wilmington, Del.

Upon being exposed to ultraviolet or visible light, the photoinitiator generates a free radical source or a cationic source. This free radical or cationic source then initiates the polymerization of the curable binder precursor.

Exemplary photoinitiators that generate a free radical source when exposed to ultraviolet light include, but are not limited to, those selected from the group consisting of organic peroxides (e.g., benzoyl peroxide), azo compounds, quinones, benzophenones, nitroso compounds, acyl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Examples of photoinitiators that generate a free radical source when exposed to visible radiation are further described, for example, in U.S. Pat. No. 4,735,632 (Oxman et al.), the disclosure of which is incorporated herein by reference.

Cationic photoinitiators generate an acid source to initiate the polymerization of an epoxy resin or a urethane. Exemplary cationic photoinitiators include a salt having an onium cation and a halogen-containing complex anion of a metal or metalloid. Other useful cationic photoinitiators include a salt having an organometallic complex cation and a halogen-containing complex anion of a metal or metalloid. These photoinitiators are further described in U.S. Pat. No. 4,751,138 (Tumey et al.), the disclosure of which is incorporated herein by reference. Another example is an organometallic salt and an onium salt described in U.S. Pat. No. 4,985,340 (Palazotto et al.); the disclosure of which is incorporated herein by reference. Still other cationic photoinitiators include an ionic salt of an organometallic complex in which the metal is selected from the elements of Periodic Groups IVB, VB, VIIB, VIIB, and VIIIB. These photoinitiators are further described in U.S. Pat. No. 5,089,536 (Palazotto), the disclosure of which is incorporated herein by reference.

Ultraviolet-activated photoinitiators suitable for the present invention may be obtained under the trade designations "IRGACURE™ 651", "IRGACURE™ 184", "IRGACURE™ 369" and "IRGACURE™ 819" from Ciba Geigy Company, Winterville, Miss., "Lucirin TPO-L", from BASF Corp., Livingston, N.J., and "DAROCUR™ 1173" from Merck & Co., Rahway, N.J. In one embodiment, the total amount of initiator (either photoinitiator, thermal initiator, or combinations thereof) may be in the range from about 0.1 to about 10 percent by weight of the curable binder precursor; in another embodiment, from about 1 to about 5 percent by weight of the curable binder precursor. If both photoinitiator and thermal initiator are used, the ratio of photoinitiator to thermal initiator is between about 3.5:1 to about 1:1.

When using a thermoset resin, the microbubble composite may be prepared by forming precursor particles comprising the thermoset resin binder and microbubbles and curing the particles. In a preferred embodiment, the first step involves forcing the binder and microbubbles through a perforated substrate to form agglomerate precursor particles. Next, the agglomerate precursor particles are separated from the perforated substrate and irradiated with radiation energy to provide agglomerate particles. In a preferred embodiment, the method of forcing, separating and irradiating steps are spatially oriented in a vertical and consecutive manner, and are performed in a sequential and continuous manner. Preferably, the agglomerate particles are solidified and handleable after the irradiation step and before being collected. Reference may be made to U.S. Pat. No. 6,913,824 (Culler et al.) which is incorporated herein by reference in its entirety.

Methods of forcing the binder precursor and solid particulates through a perforated substrate comprise extrusion, milling, calendering or combinations thereof. In a preferred embodiment, the method of forcing is provided by a size reduction machine, manufactured by Quadro Engineering Incorporated.

In one embodiment, the agglomerate precursor particles are irradiated by being passing through a first curing zone that contains a radiation source. Preferred sources of radiation comprise electron beam, ultraviolet light, visible light, laser light or combinations thereof. In another embodiment, the agglomerate particles are passed through a second curing zone to be further cured. Preferred energy sources in the second curing zone comprise thermal, electron beam, ultraviolet light, visible light, laser light, microwave or combinations thereof.

In one illustrative embodiment, the composite particles are filamentary shaped and have a length ranging from about 100 to about 5000 microns (prior to sizing). Most preferably, the filamentary shaped composite particles range in length from about 200 to about 1000 microns. In one embodiment, the agglomerate particles may then be reduced in size after either the first irradiation step or after being passed through the second curing zone. The preferred method of size reducing is with a size reduction machine manufactured by Quadro Engineering Incorporated. In one embodiment, the cross-sectional shapes of the agglomerate particles comprise circles, polygons or combinations thereof. Preferably, the cross-sectional shape is constant. Further details regarding the process may be found in the aforementioned U.S. Pat. No. 6,913,824 (Culler et al.).

Composite proppant particles that contain lesser quantities of resin, e.g., which comprise a plurality of microbubbles and a substantially discontinuous resin binder phase can be made according to the following procedure. The microbubbles and the binder resin are introduced into a mixing vessel and the resulting mixture is stirred, in some instances until it is homogeneous, i.e., a substantially uniform distribution of microbubbles and resin. It is preferred that there be sufficient liquid in the mixture that the resulting mixture is neither excessively stiff nor excessively runny. Most resins contain sufficient liquid to permit adequate mixing. After the mixing step is complete, the mixture is caused to solidify, preferably by means of heat or radiation energy. Solidification results from either the removal of liquid from the mixture or the polymerization of the resinous adhesive. After the mixture is solidified, it is crushed to form agglomerates, which are then graded to the desired size. Devices suitable for this step include conventional jaw crushers and roll crushers.

If the resin binder of such composites is a thermoplastic, it is preferred that the proppant particles be made according to the following procedure. Heat the thermoplastic resin to just above its melting temperature then combine the heated thermoplastic microbubbles are in a heated screw type extruder, and mixed until it is substantially homogeneous composite mixture results. Next, extrude the mixture through the die of the extruder. After cooling, the extrudate is reduced to desired size, e.g., by crushed and grading to yield composites of the desired size. Crushing and grading procedures frequently provide agglomerates of an undesirable size. In some instances, undesirably sized composites can either be recycled, e.g., by being added to a new dispersion, or, of course, discarded.

Fracturing

The present invention may be used in wells in which fractures are produced using any means that yields desired fractures in the underground rock formations, e.g., hydrofracturing (sometimes referred to as "hydrofraccing") and etching (such as acid etching).

The main functions of a fracturing fluid are to initiate and propagate fractures and to transport a proppant to hold the walls of the fracture apart after the pumping has stopped and the fracturing fluid has leaked off or flowed back. Many known fracturing fluids comprise a water-based carrier fluid, a viscosifying agent, and the proppant. The viscosifying agent is often a cross-linked water-soluble polymer. As the polymer undergoes hydration and crosslinking, the viscosity of the fluid increases and allows the fluid to initiate the fracture and to carry the proppant. Another class of viscosifying agent is viscoelastic surfactants ("VES's"). Both classes of fracturing fluids (water with polymer, and water with VES) can be pumped as foams or as neat fluids (i.e. fluids having no gas dispersed in the liquid phase). Foamed fracturing fluids typically contain nitrogen, carbon dioxide, or mixtures thereof at volume fractions ranging from 10% to 90% of the total fracturing fluid volume. The term "fracturing fluid," as used herein, refers to both foamed fluids and neat fluids. Non-aqueous fracturing fluids may be used as well.

Carrier Fluid and Introduction

The carrier fluid that is used to deposit the composite proppant particles in the fracture may be the same fluid that is used in the fracturing operation or may be a second fluid that is introduced into the well after the fracturing fluid is introduced. As used herein, the term "introducing" (and its variants "introduced", etc.) includes pumping, injecting, pouring, releasing, displacing, spotting, circulating, or otherwise placing a fluid or material (e.g., proppant particles) within a well, wellbore, fracture or subterranean formation using any suitable manner known in the art.

A variety of aqueous and non-aqueous carrier fluids can be used in the present invention. Illustrative examples of water based fluids and brines which are suitable for use with the present invention include fresh water, sea water, sodium chloride brines, calcium chloride brines, potassium chloride brines, sodium bromide brines, calcium bromide brines, potassium bromide brines, zinc bromide brines, ammonium chloride brines, tetramethyl ammonium chloride brines, sodium formate brines, potassium formate brines, cesium formate brines, and any combination thereof.

Illustrative examples of water based polymer and polymer-containing treatment fluids suitable for use with the present invention include any such fluids that can be mixed with the previously mentioned water based fluids. Specific water based polymer and polymer-containing treatment fluids for use with the present invention include guar and guar derivatives such as hydroxypropyl guar (HPG), carboxymethylhydroxypropyl guar (CMHPG), carboxymethyl guar (CMG), hydroxyethyl cellulose (HEC), carboxymethylhydroxyethyl cellulose (CMHEC), carboxymethyl cellulose (CMC), starch based polymers, xanthan based polymers, and biopolymers such as gum Arabic, carrageenan, and the like, as well as any combination of the above-mentioned fluids.

Illustrative examples of non-aqueous treatment fluids that can be used in the disclosure of the present invention. Such suitable non-aqueous fluids include alcohols such as methanol, ethanol, isopropanol, and other branched and linear alkyl alcohols; diesel; raw crude oils; condensates of raw crude oils; refined hydrocarbons such as gasoline, naphthalenes, xylenes, toluene and toluene derivatives, hexanes, pentanes, and ligroin; natural gas liquids, gases such as carbon dioxide and nitrogen gas, and combinations of any of the above-described non-aqueous treatment fluids. Alternatively, mixtures of the above non-aqueous fluids with water are also envisioned to be suitable for use with the present invention, such as mixtures of water and alcohol or several alcohols. Mixtures can be made of miscible or immiscible fluids.

In addition to at least one polymer material and an optional cross-linker, a treatment fluid can include at least one breaker material. In this regard, any suitable breaker known in the well treating art may be employed in a polymer treatment fluid. Examples of suitable breaker materials include any of the enzymes disclosed herein or in the patents incorporated by reference herein, and/or one or more oxidative breakers known in the well treating industry. Specific examples of suitable oxidative breakers include encapsulated breakers, such as encapsulated potassium persulfate (such as ULTRAPERM™ CRB or SUPERULTRAPERM™ CRB, available from BJ Services Company, Houston, Tex.). Other suitable breakers which may be employed in a polymer treatment fluid include conventional oxidative breakers, such as ammonium peroxydisulfate. Typically, such breakers are included in a polymer treatment fluid in a concentration of between about 0.1 lb/1000 gals (10.3 g/m$^3$) and about 10 lb/100 gals (1031.8 g/m$^3$). Most typically a conventional oxidative breaker is employed with an enzyme pre-treatment fluid comprising a polymer specific enzyme. The second fluid can also be heavily laden with breakers, water and/or scale control additives, paraffin control additives or other chemical components.

An advantage of the composite proppant particles of the invention is that they are relatively low density yet provide relatively high crush strength. Accordingly, they can be used with lower viscosity, cheaper carrier fluids.

Composite proppant particles of the invention are mixed with a carrier fluid and introduced into a well having side wall fractures which are desired to be propped open to enhance transmission of subject fluids therethrough.

The carrier fluid carries composite proppant particles into the fractures where the particles are deposited. If desired, composite proppant particles might be color coded and injected in desired sequence such that during transmission of subject fluid therethrough, the extracted fluid can be monitored for presence of composite proppant particles. The presence and quantity of different colored proppant particles might be used as an indicator of what portion of the fractures are involved as well as indicate or presage possible changes in transmission properties.

Transmission of Subject Fluid

Composite proppant particles of the invention can be used in wells to enhance extraction of desired fluids, i.e., subject fluids, such as oil, natural gas, or water, from naturally occurring or man-made reservoirs. Proppant particles of the invention may also be used in wells to enhance injection of desired fluids into naturally occurring or man-made reservoirs.

EXAMPLES

The following examples are provided to illustrates some embodiments of the invention and are not intended to limit the scope of the claims. All percentages are by weight unless otherwise noted.

Test Methods

Average Particle Density Determination

A fully automated gas displacement pycnometer, an ACCUPYC™ 1330 Pycnometer from Micromeritics, Norcross, Ga., was used to determine the density of the composite material and glass residual according to ASTM D-2840-69, "Average True Particle Density of Hollow Microspheres".

Particle Size Determination

Particle size distribution was determined using a particle size analyzer (RETSCH TECHNOLOGY™ Camsizer) available from Retsch Technology, Haan, Germany.

Strength Test

The strength of the glass microbubbles was measured using ASTM D3102-72; "Hydrostatic Collapse Strength of Hollow Glass Microspheres" with the exception that the sample size of glass microbubbles was 10 mL, the glass microbubbles were dispersed in glycerol (20.6 g) and data reduction was automated using computer software. The value reported is the hydrostatic pressure at which 10 percent by volume of the raw product collapsed.

Example 1

A Hobart T120 Mixer (available from Hobart Corp., Troy, Ohio) was charged with phenolic resin (1500 g; referred to here as PF Resin 1, 75% solids phenol-formaldehyde resin in water having a phenol to formaldehyde ratio of 1.5 to 2.1/1, catalyzed with 2.5 percent by weight potassium hydroxide.) and 1600 g of S60HS Glass Microspheres (available from 3M Company, St. Paul, Minn.). The mixture was blended for 20 minutes and the ensuing material was charged to a QUADRO™ COMIL™ 194 forming apparatus (available from Quadro Inc., Milborne, N.J.). Depending on the desired cross sectional shape of the composite microbubble precursor particles, different shaped orifices were used. Conical 10 screens with circular shaped hole orifices were used to produce composite microbubble precursor particles with circular shaped cross sections.

The slurry was added to the hopper of QUADRO™ COMIL™ apparatus by hand while the impeller was spinning at a preset speed (rpm) of 350. The rotating impeller forced the slurry through the orifices in the conical screen and when a critical length (typically, a critical length is reached when the weight of the particle is greater than any adhesive force between the formed composition and the perforated substrate) was reached, the filamentary shaped composite microbubble precursor particles separated from the outside of the screen, and fell by gravity through a UV curing chamber (obtained from Fusion UV Systems, Gaithersburg, Md.; model #DRE 410 Q) equipped with two 600 watt "d" Fusion lamps set at "high" power. The composite microbubble precursor particles were at least partially cured by exposure to the UV radiation and thereby converted into handleable and collectable particles.

In some of the examples below the composite microbubble precursor particles were further at least partially cured by placing the particles in aluminum pans and at least partially thermally curing them in a forced-air oven (obtained from Lindberg/Blue M Company, Watertown, Wis.; model number POM-246F) for about 5 hours to about 8 hours and at about 340° F. (171° C.) to about 360° F. (182° C.). Optionally, the at least partially cured composite microbubble precursor particles were reduced in size by passing them through the QUADRO™ COMIL™ apparatus. Typically, particles are reduced in size by passing them through the QUADRO™ COMIL™ apparatus, with the QUADRO™ COMIL™ apparatus equipped with conical screens that have relatively larger orifices than those used for forming composite microbubble precursor particles (see examples for specific details). For particle size reduction, the impeller rotation speed of the QUADRO™ COMIL™ apparatus was set at 252 rpm.

The extruded strands were held at 90° C. for 90 minutes, then at 105° C. overnight. The cured strands were then reduced to the desired size using a QUADRO™ COMIL™ 197. Table 1 lists the resulting density, crush strength, and particle size

Example 2

The procedure described in Example 1 was followed to prepare Example 2 with the exception that the Hobart mixer was charged with PF Resin 1 (300 g), dispersed epoxy (53 g; available from Hexion Specialty Chemicals, Inc. Columbus, Ohio, under the trade designation EPIKOTE EPI-REZ™) and S60HS Glass Microspheres (425 g). Table 1 lists the resulting density, crush strength, and particle size.

Example 3

The procedure described in Example 1 was followed to prepare Example 2 with the exception that the Hobart mixer was charged with epoxy resin (300 g; available from Hexion Specialty Chemicals, Inc. Columbus, Ohio, under the trade designation "EPON™ 828"), dicyandiamide (34.0 g; available from Air Products and Chemicals; Allentown, Pa., under the trade designation AMICURE™ CG-1400), EPIKOTE EPI-REZ™ (53 g), 2-ethyl-4-methylimidazole (3.5 g; available from Air Products and Chemicals; Allentown, Pa., under the trade designation "IMICURE 2,4 EMI") and S60HS Glass Microspheres (375 g). Table 1 lists the resulting density, crush strength, and particle size.

Example 4

The procedure described in Example 1 was followed to prepare Example 4 with the exception that the Hobart mixer was charged with PF Resin 1 (850 g), EPIKOTE EPI-REZ™ (150 g), and S60HS Glass Microspheres (630 g). Table 1 lists the resulting density, crush strength, and particle size.

TABLE 1

Density (g/cm³), Strength (psi) and Particle Size (microns) for Examples 1 to 4.

| Example | Density (g/cm³) | Strength (psi; 10%) | Particle size (microns) |
| --- | --- | --- | --- |
| 1 | 0.8342 | 14,626 | 919 |
| 2 | 0.8120 | 14,711 | 936 |
| 3 | 0.8648 | 18,572 | 949 |
| 4 | 0.8178 | 24,693 | 1302 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of propping open fractures in the walls of a bored well, comprising: (a) introducing into the well a fluid mixture of carrier fluid and a plurality of composite proppant particles, said composite proppants comprising a composite of a plurality of microbubbles and a substantially continuous resin binder phase wherein said composite proppant particles have a density from about 0.5 to about 1.8 g/cm³ and a sphericity of less than 0.7, and (b) depositing a plurality of said composite proppant particles in said fractures to yield one or more propped channels, wherein said composite proppant particles are made by a process comprising the steps of: (1) forcing a composition comprising a radiation curable polymerizable binder precursor and a plurality of solid particulates through a perforated substrate to form agglomerate precursor particles; and (2) separating the agglomerate precursor particles from the perforated substrate; and (3) irradiating the agglomerate precursor particles wherein radiation energy is transmitted from a radiation energy source to the agglomerate precursor particles to at least partially cure the binder precursor to provide agglomerate particles, and wherein the steps (1), (2), and (3) are spatially oriented in a vertical and consecutive manner, and further wherein the composite proppant particles are at least 100 micrometers in average size.

2. The method of claim 1 wherein said microbubbles are hollow.

3. The method of claim 1 wherein said microbubbles comprise glass or ceramic.

4. The method of claim 2 wherein the density of said microbubbles is from about 0.1 to about 0.9 g/cm³.

5. The method of claim 4 wherein the density of said microbubbles is from about 0.2 to about 0.7 g/cm³.

6. The method of claim 1 wherein said density is from about 0.8 to about 1.2 g/cm³.

7. The method of claim 1 wherein the average size of said microbubbles is from about 5 to about 1000 microns.

8. The method of claim 7 wherein the average size of said microbubbles is from about 10 to about 800 microns.

9. The method of claim 1 wherein the average size of said composite proppant particles is from about 100 to about 5000 microns.

10. The method of claim 9 wherein the average size of said composite proppant particles is from about 200 to about 1000 microns.

11. The method of claim 1 wherein said substantially continuous resin binder phase is selected from the group consisting of epoxy resins, acrylated urethane resins, acrylated epoxy resins, ethylenically unsaturated resins, aminoplast resins, isocyanurate resins, phenolic resins, vinyl ester resins, vinyl ether resins, urethane resins, cashew nut shell resins, naphthalinic phenolic resins, epoxy modified phenolic resins, silicone resins, polyimide resins, urea formaldehyde resins, methylene dianiline resins, methyl pyrrolidinone resins, acrylate and methacrylate resins, isocyanate resins, unsaturated polyester resins, and blends thereof.

12. The method of claim 1 wherein said composite proppant particles comprise from about 0.1 to about 75 weight percent microbubbles.

13. The method of claim 1 wherein the isotactic collapse strength of said composite proppant particles is about 500 psi (3.45 MPa) or greater.

14. The method of claim 13 wherein the isotactic collapse strength of said composite proppant particles is about 2000 psi (13.8 MPa) or greater.

15. The method of claim 13 wherein the isotactic collapse strength of said composite proppant particles is about 10,000 psi (69.0 MPa) or greater.

16. The method of claim 1 wherein said fluid mixture comprises about from about 25 to about 50 volume percent of said composite proppant particles.

17. The method of claim 1 wherein said carrier fluid has a density from about 0.8 to about 1.5 g/cm$^3$.

18. The method of claim 1 further comprising forming fractures in the walls of a bored well prior to said introducing said fluid mixture.

19. The method of claim 1 further comprising transmitting a subject fluid through said one or more propped channels after said depositing of said composite proppant particles.

* * * * *

UNITED STATES PATENT AND TRADEMARK OFFICE
CERTIFICATE OF CORRECTION

| | | |
|---|---|---|
| PATENT NO. | : 7,845,409 B2 | Page 1 of 1 |
| APPLICATION NO. | : 11/319830 | |
| DATED | : December 7, 2010 | |
| INVENTOR(S) | : Madeline P Shinbach | |

It is certified that error appears in the above-identified patent and that said Letters Patent is hereby corrected as shown below:

Column 3
Line 44, delete "made be" and insert in place thereof -- made of --.

Column 10
Line 65, delete "(2-methyacryloxyethyl)" and insert in place thereof
-- (2-methylacryloxyethyl) --.

Column 12
Line 24 (approx.), delete "benzoil" and insert in place thereof -- benzoyl --.

Line 65, delete "VIIB," and insert in place thereof -- VIB, --.

Column 14
Line 31, delete ""hydrofraccing")" and insert in place thereof
-- "hydrofracking") --.

Column 17
Line 34, delete "size" and insert in place thereof -- size. --.

Signed and Sealed this
Nineteenth Day of April, 2011

David J. Kappos
*Director of the United States Patent and Trademark Office*